United States Patent [19]

Ikuma et al.

[11] Patent Number: 5,664,636
[45] Date of Patent: Sep. 9, 1997

[54] VEHICLE WITH ELECTRIC MOTOR

[75] Inventors: Katsumi Ikuma; Sueji Nagai; Fumio Ito; Syoichiro Miyata; Yasuo Suganuma, all of Iwata, Japan

[73] Assignee: Yamaha Hatsudoki Kabushiki Kaisha, Iwata, Japan

[21] Appl. No.: 331,129

[22] Filed: Oct. 28, 1994

[30] Foreign Application Priority Data

| Oct. 29, 1993 | [JP] | Japan | 5-294140 |
| Oct. 29, 1993 | [JP] | Japan | 5-294141 |
| Oct. 14, 1994 | [JP] | Japan | 6-274346 |
| Oct. 14, 1994 | [JP] | Japan | 6-274347 |

[51] Int. Cl.$^6$ .......................... B62K 11/00; B62M 23/02
[52] U.S. Cl. .................... 180/206; 180/207; 180/220; 180/65.2; 280/212; 318/139
[58] Field of Search ............... 180/205, 206, 180/207, 220, 65.2, 219; 280/214, 212; 318/452, 139, 461

[56] References Cited

U.S. PATENT DOCUMENTS

| 4,122,907 | 10/1978 | Davidson et al. | 180/206 |
| 5,024,286 | 6/1991 | Lean et al. | 180/206 |
| 5,357,181 | 10/1994 | Mutoh et al. | |
| 5,370,200 | 12/1994 | Takata | 180/206 |
| 5,375,676 | 12/1994 | Takata et al. | 180/206 |
| 5,474,148 | 12/1995 | Takata | 180/206 |

FOREIGN PATENT DOCUMENTS

| 0517224 | 12/1992 | European Pat. Off. |
| 569954 | 11/1993 | European Pat. Off. |
| 590674 | 4/1994 | European Pat. Off. |
| 9305977 | 4/1993 | WIPO |

OTHER PUBLICATIONS

Patent Abstracts of Japan, vol. 16 No. 99 (M-1220), 11 Mar. 1992 & JP-A-03 277101 (Toyota Motor Corp) Dec. 1991.
European Search Reports dated Aug. 2, 1995. (two copies).

*Primary Examiner*—Brian L. Johnson
*Assistant Examiner*—Victor E. Johnson
*Attorney, Agent, or Firm*—Knobbe, Martens, Olson & Bear LLP

[57] ABSTRACT

An electrically powered vehicle wherein the electric power may be provided by an auxiliary electric motor with power assist being determined by a manual force applied by an operator for manually propelling the vehicle. The vehicle control includes a method for determining when the vehicle is being started from a stop and for providing a gradual application of electric power assist during such start-up. In addition, if the operator calls for an abrupt change in power assist, the actual power assist is applied only gradually to provide smoother operation. The system also has self-checking functions and the electric power assist is disabled in response to certain types of failures. However, the operator is warned in advance that the power will be shut down so as to avoid emergency situations. The self-checking provides an arrangement for checking when the speed sensor is inoperative by sensing certain output characteristics of the speed sensor and the force application. In addition, the device precludes the application of electric power assist under conditions when the battery might be depleted and when the vehicle is not actually moving. Various arrangements are provided for also checking the output of the battery and precluding power assist or controlling the power assist, depending upon the state of the battery. In addition, the vehicle may include other electrical accessories, and these are powered by an auxiliary battery. The auxiliary battery, however, may be charged from the main battery.

47 Claims, 14 Drawing Sheets

VEHICLE WITH ELECTRIC MOTOR

BACKGROUND OF THE INVENTION

This invention relates to a vehicle with an electric motor and more particularly to an improved electric motor assisted manually propelled vehicle.

There has been proposed a type of vehicle that is pedal operated, but which incorporates an electric motor for providing electric motor assist to the manual force input by the operator. This type of vehicle normally takes the form of a bicycle, but the principle may be used with a wide variety of types of manually powered vehicles.

Conventionally, the manual power is exerted on a pedal mechanism, and this pedal mechanism is coupled through a transmission including a free wheeling device to the driven wheel or wheels or other propulsion device for the vehicle. In addition, an electric motor is connected to the same propulsion device, but is operated only intermittently. An arrangement is provided for sensing the force exerted by the operator on the pedal mechanism, and then an electric power assist proportional to the manual input is added to the manual input for powering the vehicle.

This type of device has wide advantages and a great deal of utility. However, in accordance with the control arrangement and the various components of the system, there are some areas where improvements are possible. For example, there may be instances when the operator applies force to the pedal of sufficient magnitude to normally call for the application of electric power assist. However, the actual vehicle condition may be such that it would be unnecessary, and in fact undesirable, to supply electric power to the electric motor for assist.

It is, therefore, a principal object of the invention to provide an improved electrically assisted, manually operated vehicle wherein the electric assist is not applied even if the operator applies sufficient force to call for it unless the vehicle condition actually warrants power assist.

For example, the operator may actually stand on the pedals or apply force to them either when the brake is applied or when the vehicle is abutted against an object such as a wall or the like which makes forward motion impossible. If some arrangement is not provided for ensuring against electric power assist, electric power will be supplied to the electric motor by the batteries and the battery power will be depleted without the motor actually causing any operation of the vehicle.

It is, therefore, a further object of this invention to provide an improved arrangement for determining when the pedal operation actually calls for power assist from the vehicle condition and will only provide power assist when the vehicle condition warrants.

In addition to the aforenoted condition, there are times when the operator may change significantly the manual force applied to the propulsion device and where the system would normally provide substantial changes in electric power assist in response to such operator called for changes. However, if the power is suddenly changed, this can cause rather abrupt changes in speed of the vehicle, which may be undesirable in many instances.

It is, therefore, a still further object of this invention to provide an improved arrangement for controlling the application of power by the electric power assist when the operator changes significantly the force input so as to avoid abrupt changes in vehicle speed.

One condition under which such a rapid change of electric power assist may be undesirable is during initial start-up of the vehicle. When accelerating from standstill, the operator tends to place a larger force on the pedals than is required to maintain a constant speed. If this larger force is translated into an amplified electric power assist, then a jerky or abrupt start may result.

It is, therefore, a still further object of this invention to provide an improved power assist for a vehicle wherein the amount of power assist on start-up is reduced so as to reduce the likelihood of abrupt starts.

Even when traveling at steady-state speeds, the operator may decide to either accelerate or decelerate by changing the force that he applies to the pedal. If the power assist is changed at the same magnitude, then either abrupt acceleration or abrupt decelerations may result.

It is, therefore, a further object of this invention to provide an improved arrangement for controlling the amount of electric power assist in response to large variations in operator-applied force.

The disadvantages of applying large amounts of electric power to the electric motor for assist when the vehicle is stationary have been noted. Once the vehicle has been traveling under electric power assist, there may be instances where the running condition of the vehicle is such that power assist is no longer required. However, the vehicle condition or the operator input may be such that the control methodology would indicate that electric power assist is still required and would be provided.

It is, therefore, a still further object of this invention to provide an electrically assisted vehicle wherein the control for the vehicle determines when electric power assist is no longer required and shuts off the electric power under that condition.

As an example of when such a situation may occur, once the vehicle has been started and is traveling at speed, the operator may coast to a stop but still have some force applied to the pedals. If this occurs, then the electric power assist could come back on, and the vehicle might start. Alternatively, the power assist might be so small as to be insufficient to move the vehicle, but the operator would not notice the condition and the batteries could be discharged.

It is, therefore, a still further object of this invention to provide an improved electrically assisted vehicle wherein the power will be shut off at the appropriate time so that battery drainage will not result.

One type of control that has been proposed for use in electrically assisted vehicles incorporates an arrangement wherein the amount of power assist provided by the electric motor is varied in response to vehicle speed. Such arrangements are typically employed so as to prevent over-speeding of the vehicle through the use of the electric motor. Hence, some of these systems reduce the amount of power assist ratio as the speed of the vehicle increases. However, if the vehicle speed sensor is defective and does not provide a signal, then the entire control for the vehicle assist will be disabled.

It is, therefore, a still further object of this invention to provide an improved arrangement for determining when the speed sensor of an electric power assisted vehicle becomes inoperative.

In many of the desirable control routines which have been described, there are instances where for safety or other reasons the electric power may be discontinued. However, shutting off the electric power assist abruptly and without prior warning to the operator can give rise to some problems. For example, the operator may be in a condition where he would desire to know in advance that the electric power assist maybe is going to be shut off so as to cause certain operation of the vehicle and avoid sudden slowdown of the vehicle which might be unanticipated.

It is, therefore, a still further object of this invention to provide an improved electrically assisted vehicle wherein the power is shut off in response to certain conditions, but the operator is given an advance warning that the power will be shut off, and the power is not shut off until a predetermined time has elapsed.

As has been noted, the electric power assist is generated by an electric motor that is operated by a vehicle battery. There are instances, however, where the condition of the battery is such that it would be undesirable to provide electric power assist.

It is therefore, a still further object of this invention to provide an improved electric power assisted vehicle wherein the battery condition is checked periodically and electric power assist is not provided if the battery is not in a predetermined condition.

As an example of such a situation, the operator may either inadvertently or intentionally replace the battery with one having a higher voltage than the system was designed for. This could cause excessive speed of the vehicle and other problems.

It is, therefore, a yet further object of this invention to provide an electric power assisted vehicle wherein the electric power assist is precluded if the battery voltage is greater than a predetermined value.

Another condition where battery condition may be important is if the battery becomes depleted. The battery may still be at a level that it is capable of offering electric power assist, but it will be incapable of doing so in a short period of time. If the operator is not warned of this condition, then the battery power may be depleted, and the rider will not be able to have power assist when it is required.

It is, therefore, a still further object of this invention to provide an arrangement for an electric power assisted vehicle wherein the operator is warned of low battery voltage and the battery voltage is preserved during the warning time period.

In addition to the electric power motor assist for a manually operated vehicle, such vehicle's frequently carry other accessories that require battery power for their operation. Headlights and stop lights are an example of such auxiliary accessories that require electrical power. Although these accessories may be powered off of the same battery that powers the electric motor for power assist, there are many instances where this is not desirable or possible. For example, the electric motor may be designed to operate at a higher voltage than the other accessories. Furthermore, it may be desirable to insure that the battery for the power assist does not operate these accessories so as to prevent its becoming depleted. Thus, auxiliary batteries may be employed for the auxiliaries. However, these auxiliary batteries are small and may require frequent replacement which can cause problems.

It is, therefore, a further object of this invention to provide an electrically assisted vehicle having other electrically operated accessories that are operated by separate batteries but wherein those batteries may be periodically recharged from the main battery that powers the electric assist.

SUMMARY OF THE INVENTION

A number of features of the invention are adapted to be embodied in an electrically power-assisted vehicle that is comprised of a propulsion device. A manually powered device is provided for driving the propulsion device. An electric motor is also provided for driving the propulsion device. A control controls the amount of power supplied by the electric motor for driving the propulsion device. A vehicle speed sensor senses the speed at which the vehicle is driven and a force sensor senses the force applied to the manually powered device.

In accordance with a first of these features, the control establishes an initial force which must be sensed by the force sensor before electrical power assist will be supplied by the electric motor. The speed of the vehicle sensed by the speed sensor is compared with a predetermined speed when the predetermined force is applied and preclude the application of electric power assist unless the predetermined speed is exceeded.

In accordance with a second feature of the invention, the control has means for determining that the manual force applied calls for initial start-up at the vehicle and determines from the initial force sensed by the force sensor a desired power assist. Initially only a portion of this initially desired power assist is provided for a time interval and thereafter the amount of power assist is increased in predetermined time intervals to provide a smooth start-up.

In accordance with a third feature of the invention, the control provides a power assist from the electric motor that is derived as a function of vehicle speed sensed by the vehicle speed sensor and operator manual force as sensed by the force sensor under steady state conditions. The speed and force values are read at time intervals and if succeeding readings of the values call for a variation in the amount of power assist, the amount of power assist is changed at an incremental rate to that called for so as to avoid abrupt changes in power assist.

In accordance with a fourth feature of the invention, the control is effective to discontinue electric motor power assist when the vehicle speed signal indicates less than a predetermined speed and when the output of the force sensor is less than a predetermined value for a predetermined time.

In accordance with a fifth feature of the invention, the control is effective to discontinue electric motor power assist when the vehicle speed sensor indicates less than a predetermined speed and when the output signal of the force sensor does not vary by more than a predetermined amount within a predetermined time period.

In accordance with a sixth feature of the invention, the control is operative so that if the speed sensor does not output a signal of speed and the force sensor does not output a signal indicative of more than a predetermined force difference in a predetermined time period in which the speed sensor outputs no signal, it is determined that the speed sensor is defective and power assist is discontinued.

In accordance with a seventh feature of the invention, means are provided for sensing a defect in the vehicle and means provide an indication of the defect and discontinues power assist after a predetermined time period from the initiation of the indication of the defect.

In accordance with an eighth feature of the invention, the vehicle is provided with a battery for providing electrical power to the electric motor. A battery voltage tester tests the output of the voltage of the battery. Means are provided for precluding the transmission of electrical power from the battery to the electric motor if the battery voltage is different than a predetermined voltage.

Another feature of the invention is adapted to be embodied in an electrically powered vehicle having an electric motor, a vehicle propulsion device driven by the electric motor and a main electric battery for supplying electric power to the electric motor. In addition, the vehicle is provided with at least one electrically operated accessory. An accessory battery is provided for powering the electric accessory. A battery charging circuit is interposed between the main battery and the accessory battery for charging the accessory battery.

DETAILED DESCRIPTION OF THE PREFERRED EMBODIMENTS

The Vehicle

Figure 1:
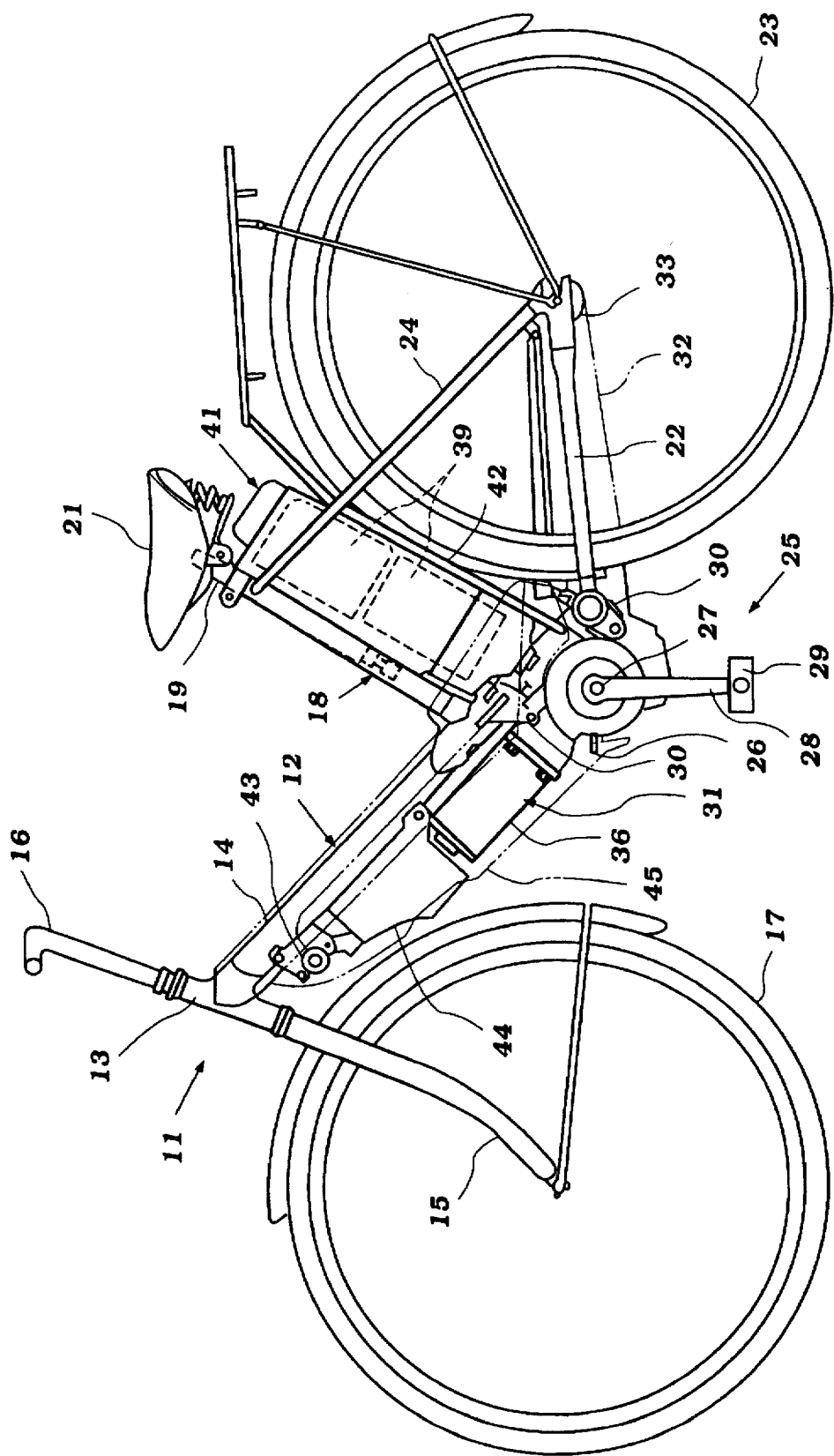
FIG. 1 is a side elevational view of an electric power assisted bicycle constructed and operated in accordance with an embodiment of the invention.

Referring now in detail to the drawings and initially to FIG. 1, an electric power-assisted bicycle constructed and operated in accordance with an embodiment of the invention is indicated generally by the reference numeral 11. The invention is described in conjunction with an electric power assisted bicycle as it has particular utility in such an application. It will be readily apparent to those skilled in the art, however, how the invention may be applied to other types of vehicles having electric power assist for their propulsion device and that certain features of the invention may also be employed in vehicles that are powered by electrical batteries and which have no manual power therefor.

The bicycle 11 is comprised of a frame assembly, indicated generally by the reference numeral 12 that is comprised of a head pipe 13 and a main tube 14. The head pipe 13 journals a front fork 15 for steering movement as is well known in this art. The front fork 15 is connected to a handlebar assembly 16 for the steering of a front wheel 17 that is rotatably journaled by the front fork 15.

A seat pillar 18 extends upwardly from the lower portion of the main tube 14 and carries a seat post 19 for vertical adjustment of a saddle type seat 21 carried thereby.

A pair of main back stays 22 extend rearwardly from the lower portion of the main tube 14 and journal a rear wheel 23 for rotation. Auxiliary back stays 24 interconnect the upper end of the seat pillar 18 and the back stays 22 so as to assist in the support for the rear wheel 23.

The rear wheel 23 forms the propulsion device for the bicycle 11 and it is powered primarily by a manually operated power device in the form of a pedal assembly, indicated generally by the reference numeral 25. The pedal assembly 25 is supported on a transmission case 26 and includes a crankshaft 27 journaled therein. A pair of crank arms 28 are connected to the opposite ends of the crankshaft 27 and carry pedals 29 at their ends for accommodating the feet of a rider seated on the seat 21. The transmission case 26 is connected to the frame 12 by brackets 30.

In addition, electrical power assist is provided by an electric power system, indicated generally by the reference numeral 31. The electric power assist 31 and pedal assembly 25 are connected through a transmission device, to be described, to a drive for the rear wheel 23.

In the illustrated embodiment, this is comprised of a chain 32 that is trained over a sprocket 33 affixed for rotation with the rear wheel 23 at its rear end. The forward portion of the chain is driven by a transmission of the type described in the co-pending application entitled Drive Arrangement For Electric Assisted Bicycle, Ser. No. 08/279,337, filed Jul. 22, 1994 in the names of Masahiro Suzuki, Hisatoshi Akira and Nozomu Takata and assigned to the Assignee hereof. The disclosure of that patent is incorporated herein by reference and may be referred to for the details of the actual driving relationship, the constructional details of which form no part of the present invention.

However, those components are shown schematically in FIG. 2 and will be described by reference thereto as well as to FIG. 1. The manual drive and specifically the crankshaft 27 is connected to the drive chain 32 through a drive which includes a one-way clutch, shown schematically at 34 in FIG. 2. There may be also interposed a planetary-type of transmission between the crankshaft and the drive chain 32. The drive chain 32 is, in turn, connected to the sprocket 33 as aforenoted, and this is connected to the rear wheel 23 by means of a one-way clutch 35.

The electric power assist 31 includes an electrically operated motor 36 which is provided with an integral roller-type planetary transmission 37 which, in turn, drives the chain 32 through a one-way clutch 38.

Figure 3:
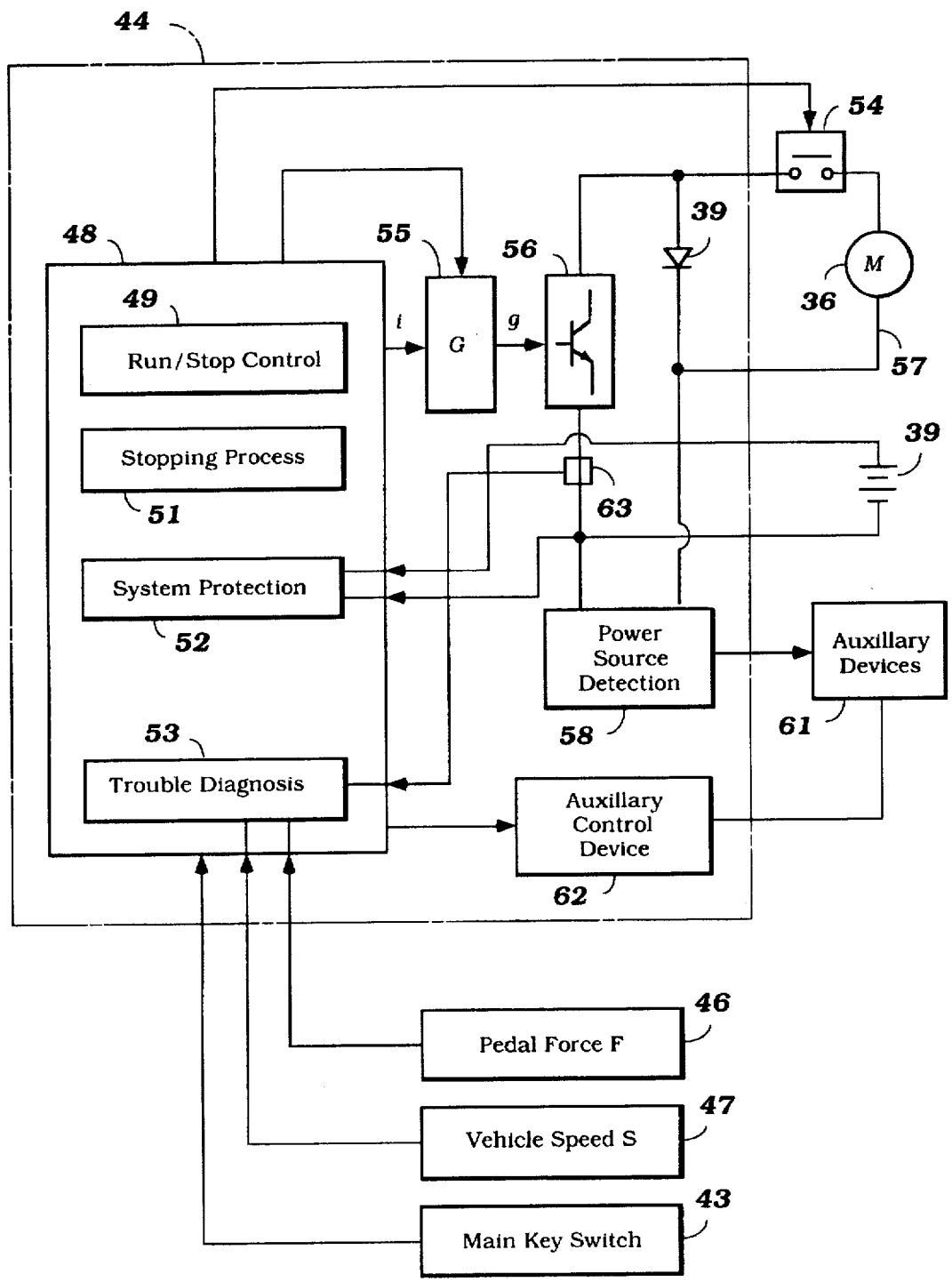
FIG. 3 is a partially schematic view of the electrical components of the system.

The electric motor 36 is powered from a pair of rechargeable batteries 39 that are contained within a battery case 41 that is disposed behind the seat pillar 18 and forwardly of a pair of auxiliary back stays 42. These batteries 39 supply electrical power through a main switch 43 to a controller 44. The controller 44 has a construction and operation as shown in FIG. 3 and will be described later by reference to that figure. The electric motor 36 and controller 44 are contained within a protective casing, shown in phantom in FIG. 1 and indicated generally by the reference numeral 45.

Figure 2:
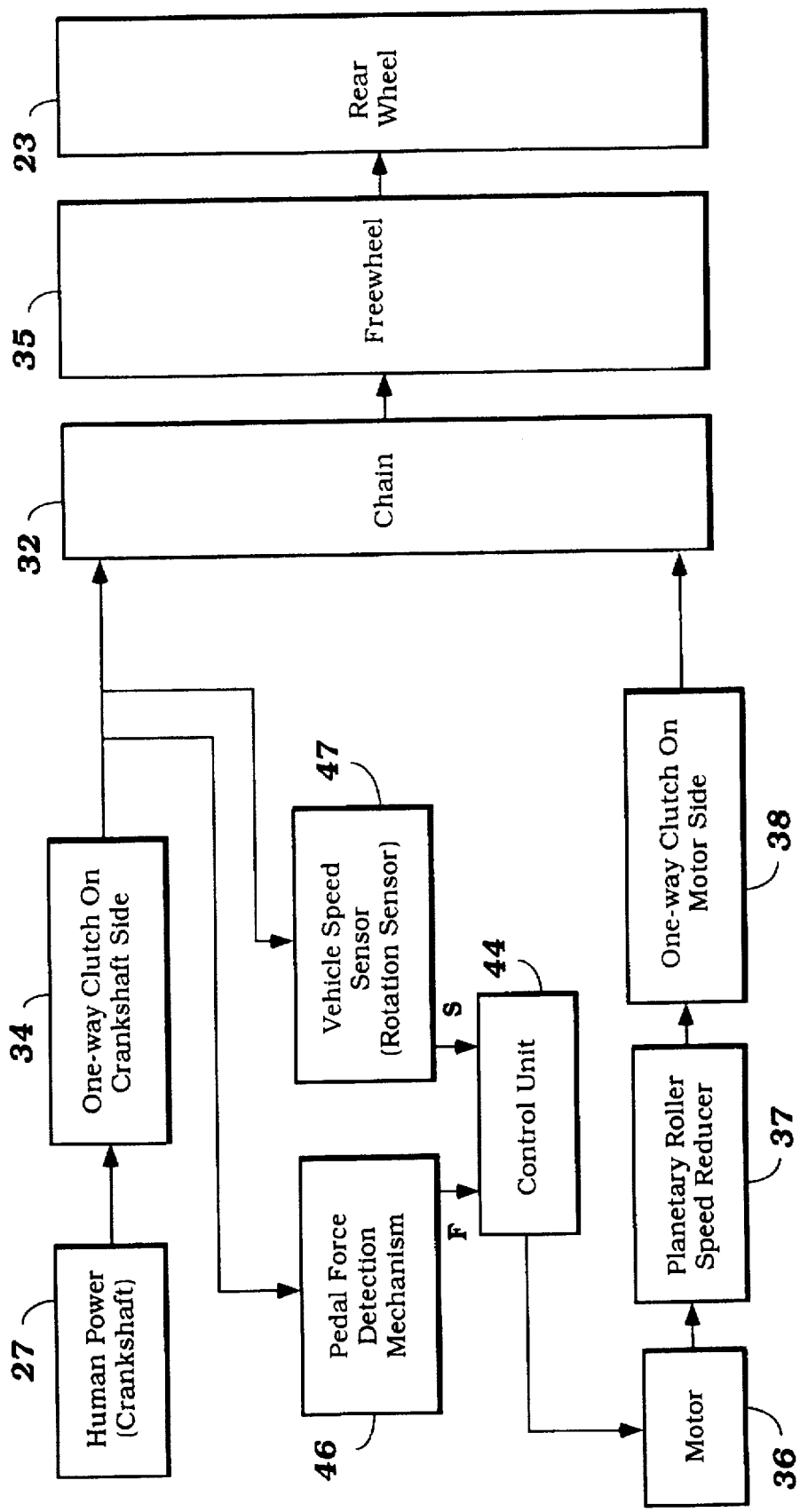
FIG. 2 is a schematic block diagram showing the interconnection of the manual and electric power assist to the driven rear wheel of the bicycle.

As noted in the aforenoted copending application, the transmission connecting the pedal assembly 25 to the chain 32 includes a torque sensor which does not appear in FIG. 1, but which is shown in FIG. 2 in block form and is identified generally by the reference numeral 46. This torque sensor 46 outputs a signal to the control unit 44 of the force F exerted by rider on the pedals 29.

This transmission mechanism also includes a vehicle speed sensor, which does appear in FIG. 1 and is identified by the reference numeral 47. This speed sensor 47 also appears in FIG. 2 and indicates its connection to the control unit 44 in schematic form.

The Control Unit

The control unit 44 and its interrelationship with the various elements of the system will now be described by reference to FIG. 3 which generally comprises a schematic electrical diagram. It should be noted that the control unit 44 includes a CPU 48 which has a number of functional sections to control the operation and testing of the system. These include a run-stop control section 49, which controls the start-up and running of the power assist. Basically, the run-stop control routine is depicted generally in FIG. 4 with the various control phases of it shown in FIG. 5 which shows the start-up operation, FIG. 6 which shows the running condition for accommodating changes in power assist requirement.

In addition, there is provided a stopping process section 51 that operates so as to discontinue power assist under certain conditions as will be described. The stop process function will be described by reference to FIG. 8. Also included is a system protection function 52 which will be described by reference to FIGS. 9 and 10 and a trouble diagnosis section 53 which will be described by reference to FIGS. 9 and 11–13.

The main switch 43 is connected to the CPU 48 which, when the main switch is energized, closes a main relay 54 that controls the supply power to the electric assist motor 36 by the CPU 48. The CPU 48 outputs a power command signal i to a gate circuit 55 which, in turn, switches a switching circuit such as a MOS-FET 56 in response to the signal g to supply power to the electric assist motor 36. The power output of the motor 36 is controlled by means of changing its duty ratio and this changes the torque output $T_M$ to change the ratio of on time to total time (on and off time) to vary the power. The electric motor 36 is positioned in a main circuit 57 which connects the switching circuit 56 to a power section 58 for supplying electrical power to the motor 36 through the main circuit 57. A flywheel diode 58 is shunted across the motor 36 in the circuit 57.

The bicycle 11 may be provided with other electrical power operated auxiliary devices, shown schematically at 61 in FIG. 3 and these are controlled by respective auxiliary control devices 62. The auxiliary devices 61 may comprise things such as headlights, taillights, and various meters. The power source section 58 may include a small auxiliary battery that supplies power for the auxiliary devices 61. This battery may be charged from the main battery 39 through the power source selection circuit 58.

The Control Routines

Figure 4:
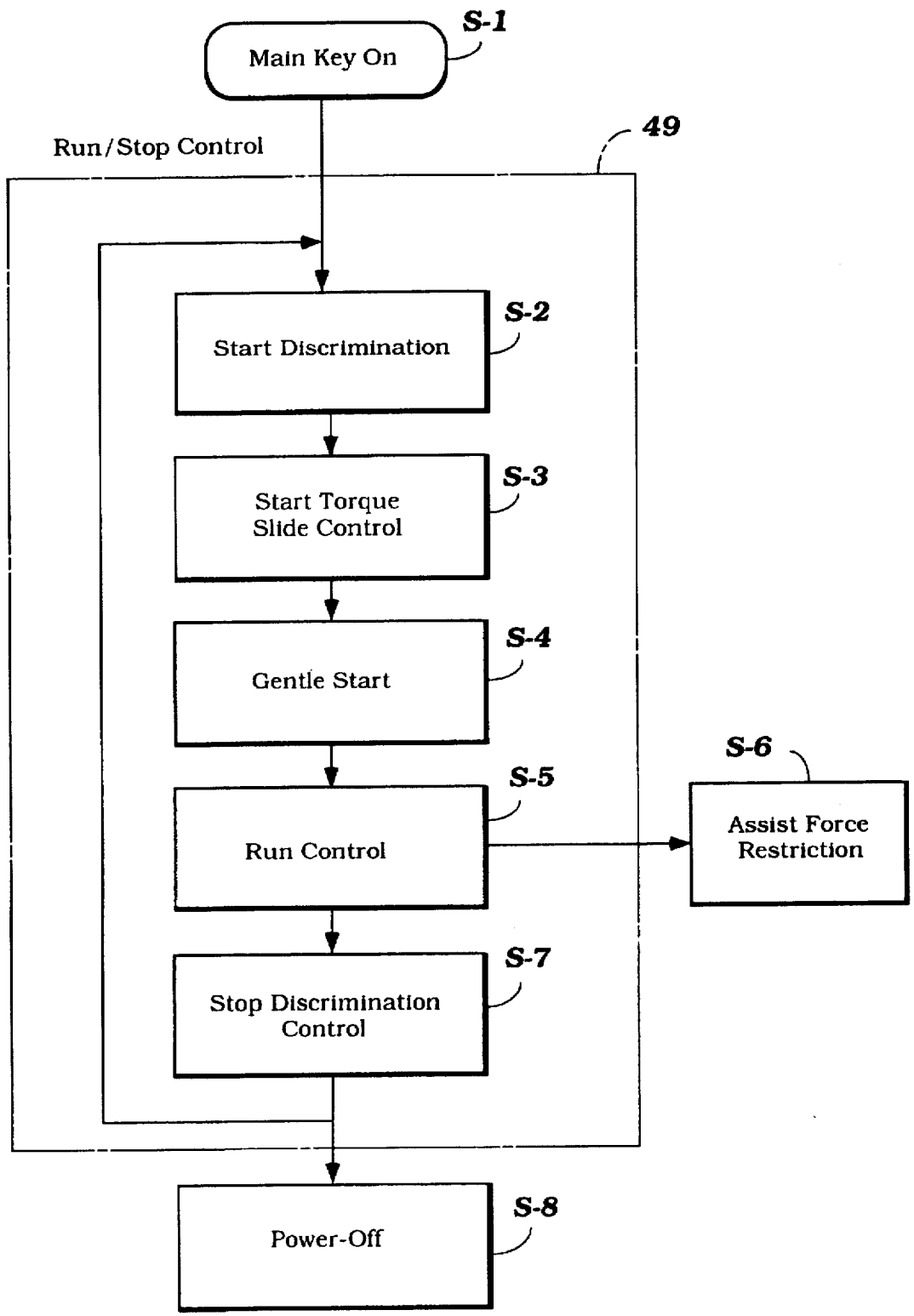
FIG. 4 is a block diagram of the control routine beginning at initial turning of the main switch on and terminating at the power off condition.

The control methodology and structure for accomplishing them will now be described beginning with a description of FIG. 4. FIG. 4 illustrates the entire procedure generally beginning at the step S1 when the main switch 43 is first turned on. After this, the program moves to the run-stop control routine established by the run-stop control section 49 of the CPU 48. The first step S-2 begins the discrimination of the condition of the system to determine if there is initial start-up, as will be described later by reference to FIG. 5. If it is determined by the discrimination procedure that the bicycle 11 is first being pedaled from a standstill to reach speed, the program then moves to the start torque slide control routine of S3 which provides the gentle or smooth start operation S-4. It should be noted that the main switch 43 may turned on when the bicycle is already in motion. That is, the rider may determine that he wishes to operate the bicycle only manually and thus leave the main switch 43 off, as is possible, and ride the bicycle 11 as a normal bicycle only using pedal power from the pedal mechanism 25. If, however, during riding mode the operator determines to call for electric power assist he may, at that time, switch the main switch 43 on.

If this occurs, the program will determine at the step S2 that the bicycle has already been in motion and the start mode is not required. Then the program will move on the run control routine at step S-5. Alternatively, after the start mode is operated, and start-up with the gentle start routine of S-4 has been completed, the program moves to the step S-5 for normal run control. During this normal run control there is also an assist force restriction procedure indicated at S-6 which prevents sudden changes of power assist in response to sudden changes of pedal force exertion. This routine will be described in conjunction with FIGS. 6 and 7.

Finally, the program also includes a stop discrimination control at the step S7 in which the CPU 48 determines if the power should be shut off. When this is done, the CPU 48 moves to the stop process section 51 and institutes a stop process eventually the power is shut off at the step S-9.

The foregoing description is intended to present an overview of the total operation of the system. It should be noted that in addition to this, there are certain diagnostic and checking functions that are accomplished at regular time intervals, e.g., every 10 milliseconds, as long as the main switch is on. The start-up routine will be described by particular reference to FIG. 5. However, before going through the step-by-step operation, it is believed that a general overview of the logic for the start-up control would be helpful.

Figure 5:
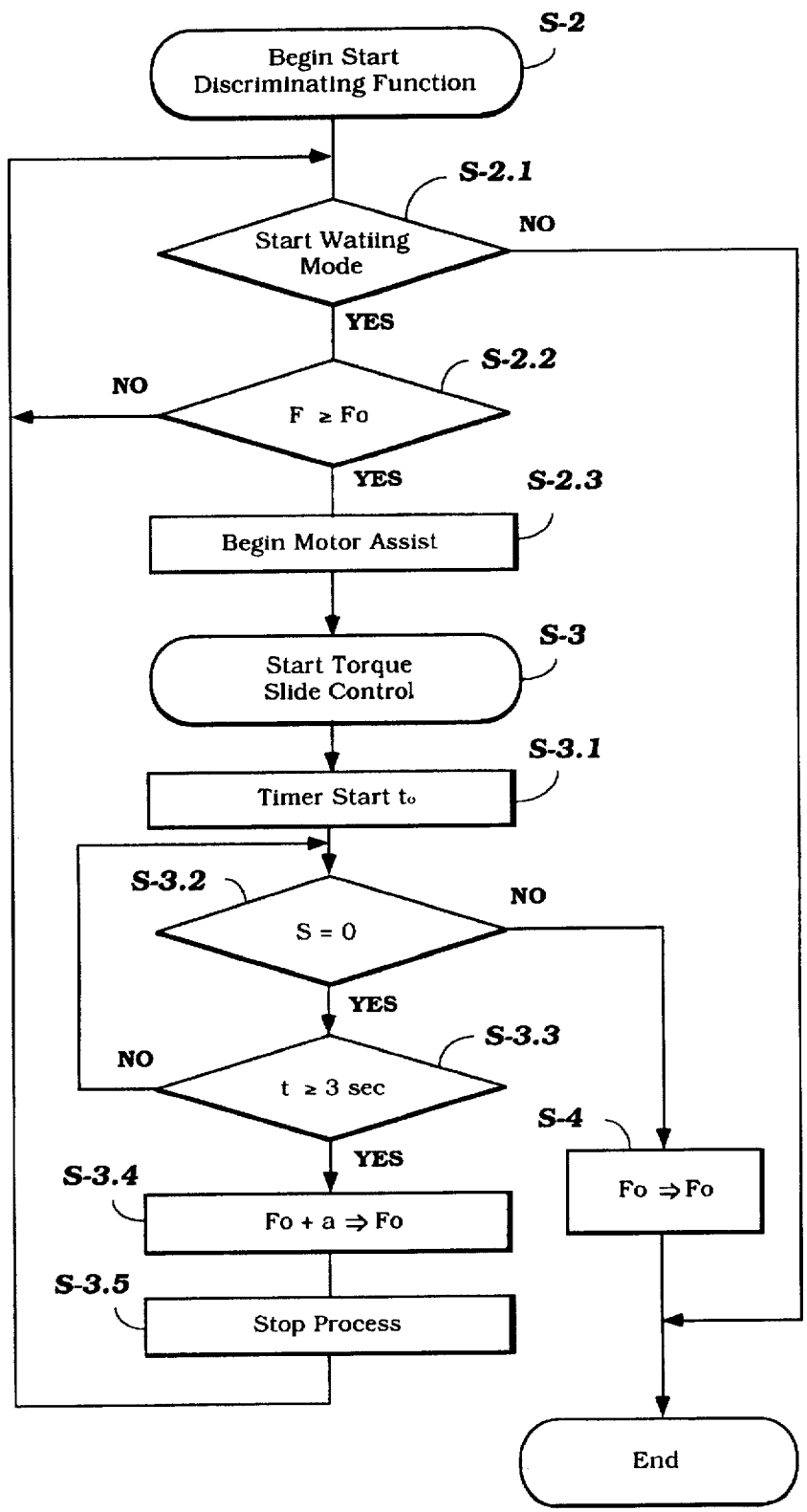
FIG. 5 is a block diagram showing the control routine for determining initial start and slow or torque slide control for initial start-up.

The Start-up Control and Smooth Start (FIG. 5)

As has been noted, the main switch 43 may be turned on actually when the bicycle is being pedaled and hence it must be determined at the start discrimination step S-2 if a start-up procedure is to be initiated or if the bicycle is already traveling at speed. The way the existence of a start-up determination is made is by sensing if the pedal force as determined by the pedal force sensor 46 is a high enough force as to indicate that the rider is initiating to start the bicycle and the bicycle speed is low. A typical force that could be applied for this threshold value $F_0$ is 30 kg. If the 30 kg force is equalled or exceeded, then electric motor assist is begun.

However, there may be a situation where the rider is standing on the pedals 29 and applying a large force but the bicycle is being held stationary either by operation of its brake or because it is against an immovable object. If the start assist of the electric motor were turned on and permitted to remain on under such a condition, the battery voltage would be depleted quickly. Therefore, the program has a start torque slide control which in effect monitors the speed of the bicycle and if the speed maintains at below a predetermined value, for example 0, for a given length of time, then the threshold starting force $F_0$ is increased incrementally. After a certain number of increments, and the starting force still has not been exceeded and the bicycle is moving, the system will then shut down.

Turning now specifically to FIG. 3, as noted, the program begins at the step S-2 which begins the start discrimination function. This occurs, as has already been noted, when the main switch 43 is turned on. The program then moves to the step S-2.1 to determine if the system is in the start waiting mode or not. If the start waiting mode is not in existence, the program ends but the checking functions later to be described can be continued to proceed.

If, however, at the step S-2.1 it is determined that the start waiting mode has been initialized, then the program moves to the step S-2.2 to determine if there is a start-up force present. That is, the actual pedal force F is compared with the threshold force $F_0$ (30 kilograms in the specific example). If the force F is not greater than or equal to the threshold force $F_0$, the program moves back to the step S-2.1. If at the step S-2.2 the force F exceeds the threshold force $F_0$, the program then moves to the step S-2.3 so as to begin electric motor assist and turn the assist on. The program then moves to the start torque slide control routine of step S-3.

In this routine, a timer is started at the step S-3.1 so as to start a relatively short timer running, for example setting a time period $T_0$ of three seconds. The program then moves to the step S-3.2 to check the bicycle speed. It is determined whether the bicycle speed is greater than a predetermined speed as sensed by the speed sensor 47 and in the specific example this speed is set at zero. If the bicycle speed does not exceed this speed of zero, then the program moves to the step S-3.3 to check and see whether the time since the timer has started exceeds that preset time of three seconds. If it does not, the program moves back to the step S-3.2.

If, however, the timer started at the step S-3.1 has run out (three or more seconds have elapsed) and the bicycle still is stationary, the program moves to the step S-3.4 so as to increase the threshold value $F_0$ by adding an incremental force amount $\alpha$ to it. This increment is chosen so as to gradually raise the starting force required so as to ensure that undue power consumption will not occur. The program then stops power assist at the step S3.5 and repeats back to the step S2.1. Each time the program returns to the step S3.3 and a start of the bicycle has not occured the threshold value $F_0$ is increased again by the amount $\alpha$.

If at the step S-3.2 it is determined that the bicycle has begun to move, then the program moves to the step S-4 to begin the gentle start operation.

This gentle start operation functions so as to set a force of assist for the start-up of the bicycle. However, the force is a force that is substantially reduced from that called for by the normal assist determined by the program for the force exerted since a sudden application of power could provide an abrupt start. In order to determine the initial force for the smooth start-up, the steady-state force assist of the motor is determined from a map and one-tenth of this amount is actually applied for a predetermined time period, for example, 0.015 seconds. This then is continued to increase in equal 10% intervals during such time periods until the target assist amount is reached. At that time the process removes to the run control routine of step S-5. Another type of gentle start routine will be described later by reference to FIG. 14.

Normal Run Control-Assist Force Reduction

Once the program moves to its normal run control at the step S-5, the program initiates an assist force reduction so as to minimize the total amount of assist change in response to a change in the pedal force applied so as to avoid abrupt changes in pedal assistance. In the normal run control routine of S-5, the CPU 48 in the section 49 reads a map that gives the desired assist amount from vehicle speed S, as sensed by the vehicle speed sensor 47, and pedal force F, as sensed by the pedal force sensor 46. This amount is read at regular constant time intervals, such as 0.01 seconds, and the assist force is determined by controlling the duty cycle of the motor 36, as aforenoted.

Figure 6:
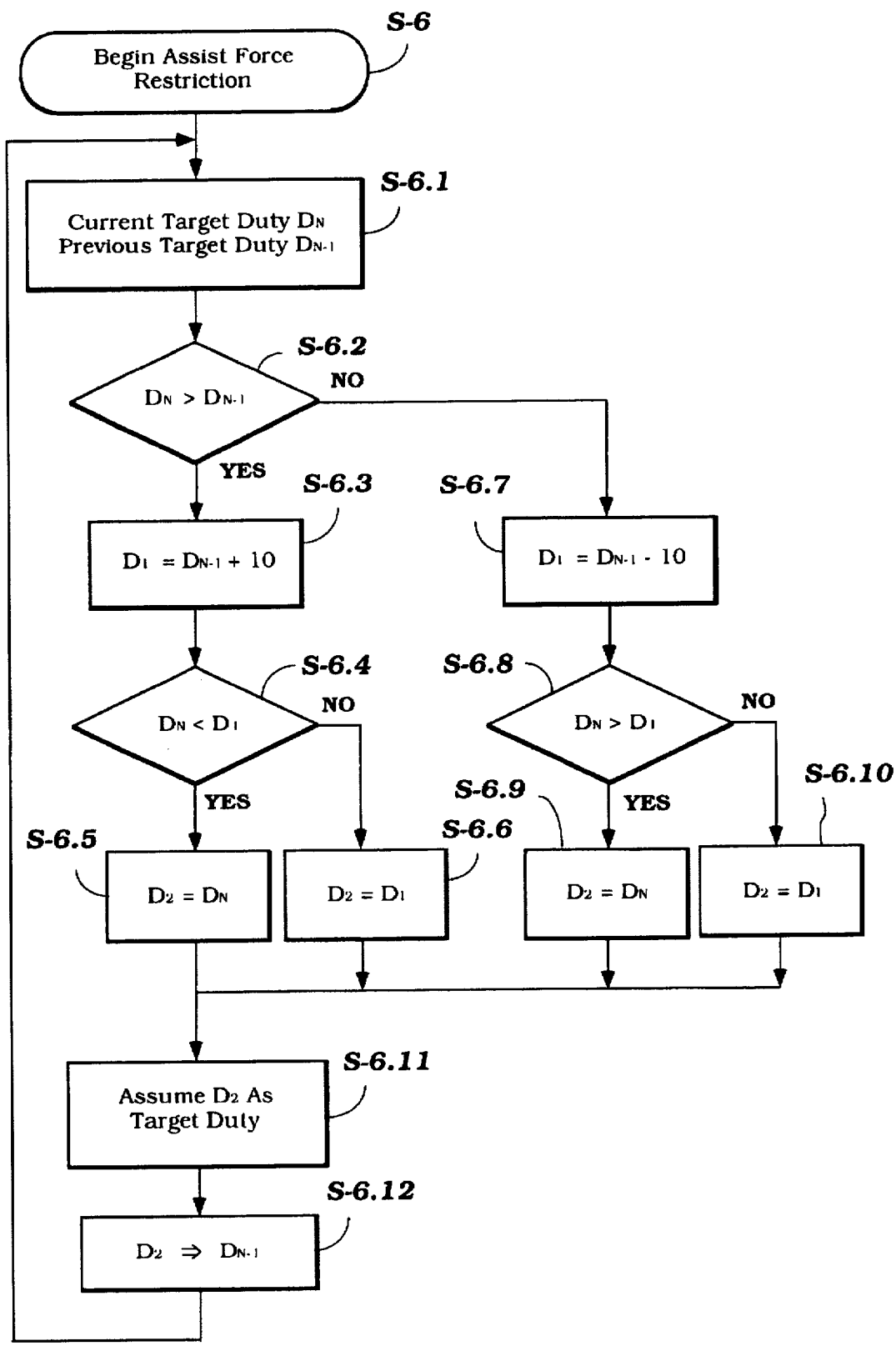
FIG. 6 is a block diagram of the control routine for force assist reduction in the event of a change in the applied pedal force.

However, if there is a change in the pedal force, then the assist reduction routine of S-6, which is shown in detail in FIG. 6, is initiated. This assist reduction section provides an assist ratio, as shown by the curve A in FIG. 7, which is more gradual than that actually called for by the pedal force and speed map, as shown by the curve B. Basically the way the system operates is to measure the instantaneous target duty ratio $D_N$ and compare this with the previously measured target duty ratio $D_{N-1}$. If the change is more than 10 percent in absolute duty ratio, then the maximum 10 percent changed duty ratio is adopted. If it is less than this, then the actual duty ratio called for is applied. That is, the amount of assist is limited only if it exceeds 10 percent. This 10 percent is an absolute 10 percent duty ratio, not 10 percent of the required duty ratio, as may be seen by FIG. 7.

Therefore, the program moves to the step S-6.1 to measure the current target duty ratio $D_N$; the previous target duty ratio, if there is one, has been previously memorized and it is $D_{N-1}$. Then, at the step S-6.2, the new duty ratio $D_N$ is compared with the previous duty ratio $D_{N-1}$ to determine if the duty ratio is increasing or decreasing. If it is increasing, then the program moves to the step S-6.3 so as to set a duty ratio $D_1$ by adding to the previous target duty ratio, $D_{N-1}$, a sum of 10 percent. $D_1=D_{N-1}+10$. The program then moves to the step S-6.4 so as to compare $D_N$ with $D_1$. If $D_N$ is greater than $D_1$ (the increase is more than 10 of the previous value), the program then moves to the step S-6.5 so as to establish as the new target duty ratio $D_2$ the current target duty ratio $D_N$ ($D_2=D_N$). In other words, if the increase is less than 10 percent from the previous value, then the actual new value is used.

If, however, at the step S-6.4 it is determined that the present called for duty ratio $D_N$ is not less than $D_1$, then the program moves to the step S-6.6 to substitute the 10 percent increase ratio, $D_1$, for the new target duty ratio $D_2$.

If at the step S-6.2 it is determined that the current target duty ratio $D_N$ is not greater than the previous target duty ratio $D_{N-1}$, then the program moves to the step S-6.7 so as to begin a decrease in the duty ratio. At this step a new value for $D_1$ is established, which is the previous target duty ratio $D_{N-1}$ less 10 ($D_1=D_{N-1}-10$). The program then moves to the step S-6.8 so as to determine if the present target duty ratio $D_N$ differs from the previous target duty ratio $D_{N-1}$ by more than 10 percent by determining if $D_N$ is greater than $D_1$. If it is, then the program moves to the step S-6.9 so as to substitute as the new target duty ratio $D_N$ the current target duty ratio $D_N$.

If, however, at the step S-6.8 it is determined that the decrease in target duty is greater than 10 percent from the previous target duty, the program moves to the step S-6.10 so as to substitute the lesser value $D_1$ for the new target ratio $D_2$, thus the decrease is never more than 10 greater than the previous to a void sudden decelerations in power.

Hence, once the new target duty ratio $D_2$ is determined at the steps S-6.5, S-6.6, S-6.9, or S-6.10, the program moves to the step S-6.11 to assume $D_2$ as the new target duty ratio, and this assist is then applied by the motor 36. The program then moves to the step S-6.12 so as to substitute $D_2$ for the previous target duty ratio $D_{N-1}$, and the program repeats back to the step S-6.1.

Figure 7:
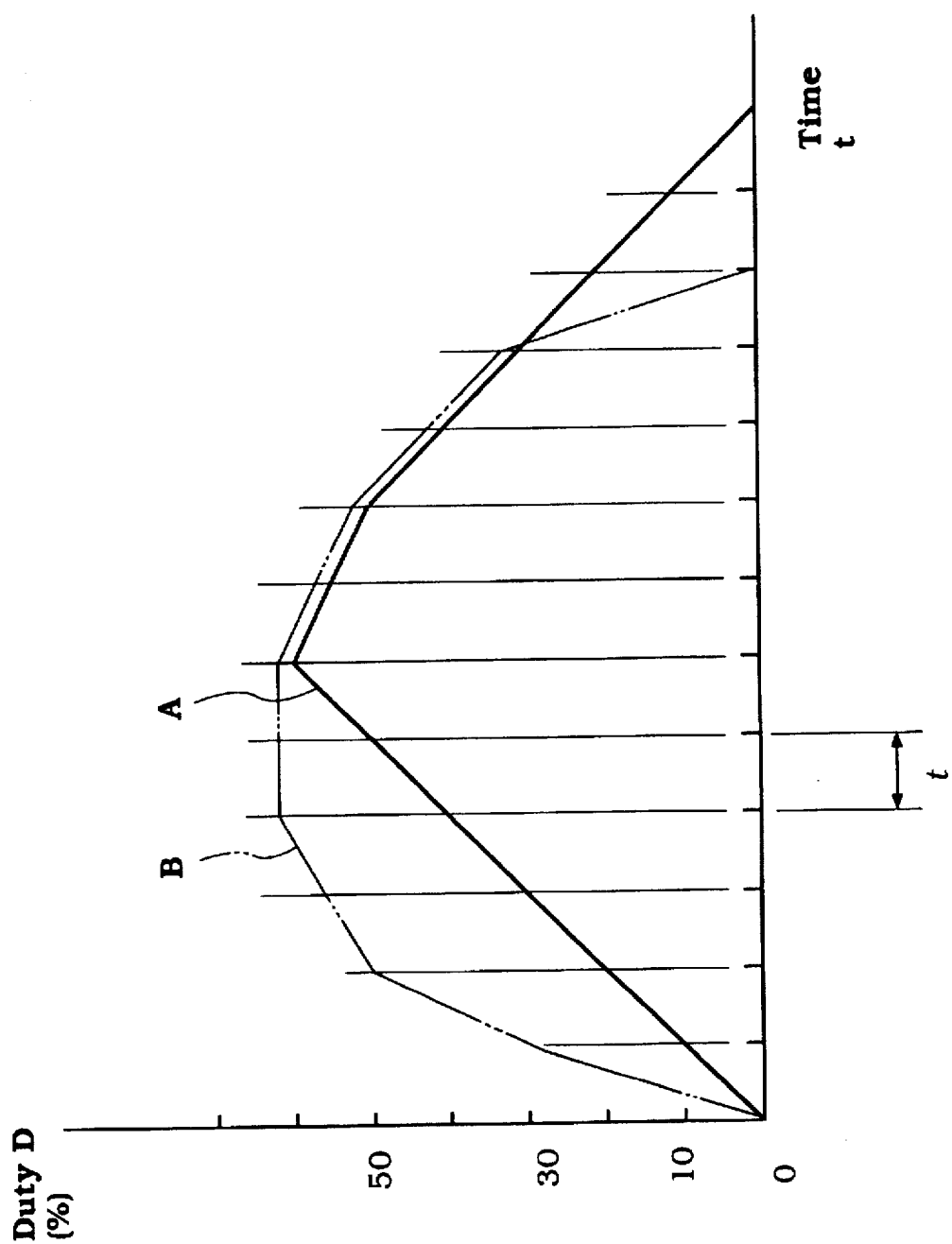
FIG. 7 is a graphical view showing the relationship of duty ratio to time in connection with a system that does not employ the torque slide and/or assist force reduction of the invention (curve B) and in accordance with the invention (curve A).

As can be seen from FIG. 7, limiting the amount of change in duty ratios during these relatively small time periods 0.01 seconds provides a more gradual variation in power assist and will not provide an uncomfortable ride nor shocks in either acceleration or deceleration.

The system also is effective to reduce the amount of electric motor assist when traveling at high speeds, and that can be done by setting a small value on a map for the assist ratio relative to high vehicle speeds.

Stop Discrimination Control

In addition to the run stop control section 49 of the CPU 48 and as has been noted, the CPU 48 is provided with the stop discrimination control section 51, which utilizes the stop discrimination control S7 of the control routine shown in FIG. 4. This routine operates so as to discontinue electric motor assist, not upon application of the brake, as is typical with other systems, but upon the existence of zero vehicle speed and a pedal force less than a given value $F_1$ for a given time period $T_0$ (one second, as an example). The force $F_1$ may correspond to a force of 12 kg or a torque of 2 kg per meter, by way of an example.

Figure 8:
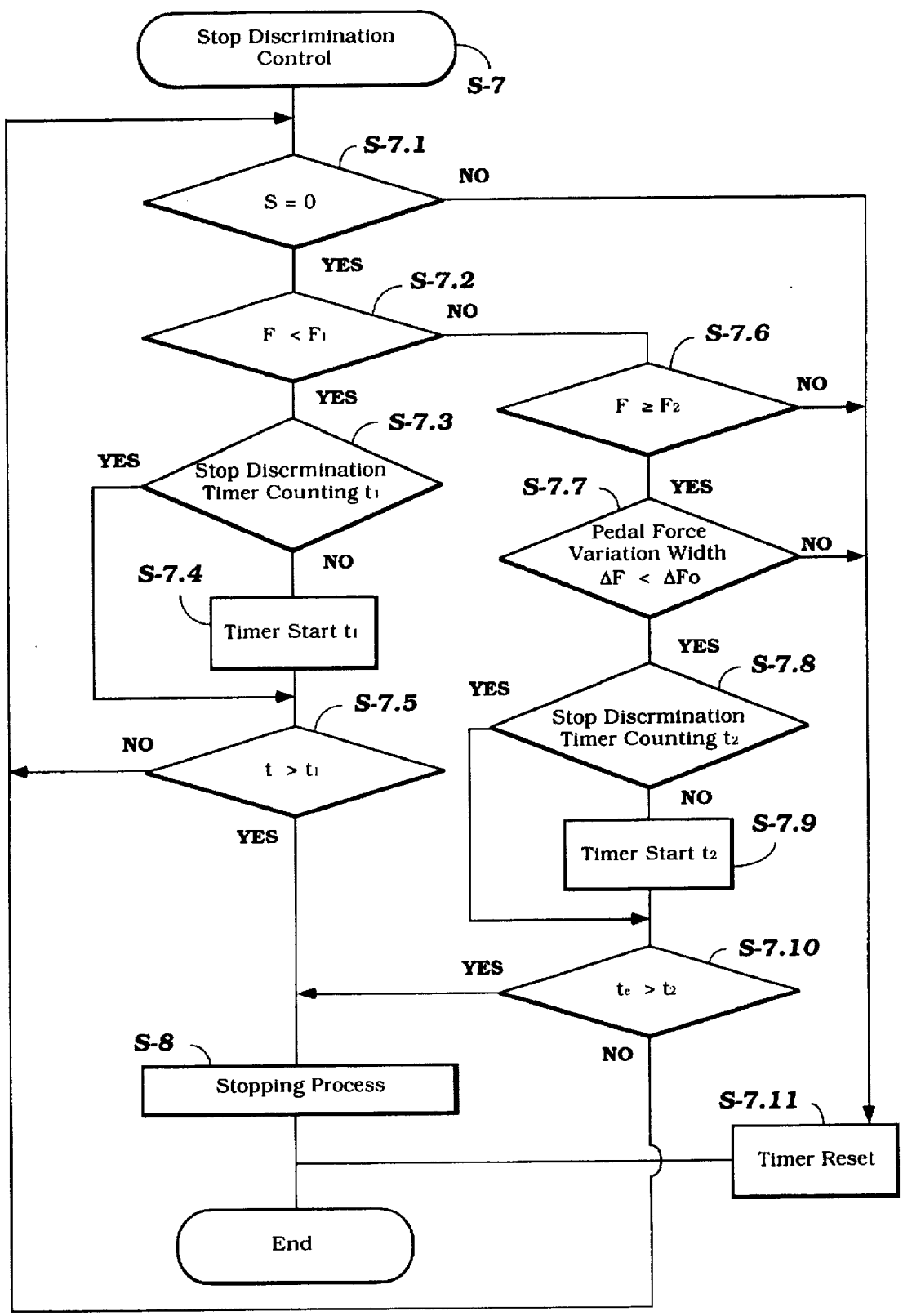
FIG. 8 is a block diagram of the control routine for power stop.

Referring now specifically to FIG. 8 for this control routine, it begins at the step S-7.1 so as to determine if the vehicle speed determined by the vehicle speed sensor 47 is equal to zero. If it is, the program moves to the step S-7.2 so as to compare the actual pedal force F determined by the pedal force sensor 46 with the threshold value $F_1$, as previously noted. If the force F is less than $F_1$, as determined at the step S-7.2, the program moves to the step S-7.3 to determine if the timer that runs for the time $t_1$ is running. If it is not, the program moves to the step S-7.4 to start this timer. The program then moves to the step S7.5, which determines if the timer has run so that the elapsed time t is greater than $t_1$. If at the step S-7.3 it is determined that the timer was already running, the program jumps to the step S-7.5.

If at the step S-7.5 it is determined that the time t does not exceed that of the timer $t_1$, the program repeats back to the step S-7.1 to condition that the bicycle 11 is still stationary, and then the program repeats.

If, however, at the step S7.5 it is determined that the time t exceeds that of the timer $t_1$, the program then moves to the step S-8 so as to initiate the stop process. The way this is done will be described later but it should be noted that the system operates so that power will not be abruptly shut off.

If at the step S-7.2 it is determined that the force applied to the pedal F is not less than the force $F_1$, then the program moves to the step S-7.6 so as to compare the actual pedal force with another pedal force $F_2$ which is greater than $F_1$. This pedal force may be the same pedal force as used to determine the start-up mode, i.e., 30 kg. If at the step S-7.6 it is determined that the actual pedal force F is greater than the higher threshold force $F_2$, then the program moves to the step S-7.7 so as to measure the variation in pedal force $\Delta F$ with a given $\Delta F_0$ value, such as 12 kg. If the variation is less than this, then the program moves to the step S-7.8 to determine if a second discrimination timer is counting a time period $t_2$. This time period $t_2$ is a longer time period than the time period $t_1$ in a preferred embodiment and may be two seconds. The system operates so that if the pedal force variation ($\Delta F$) does not exceed the threshold value of 12 kg ($\Delta F_0$) in this time period, then it is determined that the program process should be stopped. If at the step S-7.8 the second timer $t_2$ is not running, it is started at the step S-7.9.

At the step S-7.10 the actual elapsed time is compared with the time $t_2$, and if it is greater, the program moves to the step S-8 to initiate the stop process. If at the step S-7.6 the force F is not greater than or equal to the force $F_2$, or if at the step S-7.7 the pedal force variation with $\Delta F_0$ is not less than the predetermined value $\Delta F.0$, the program jumps to the step S-7.11 to reset the counter and end this stop program.

Regardless of how it is determined to arrive at the stop process of S-8, when this process is reached, power is not shut off abruptly as aforenoted. Rather, the motor output is gradually decreased to zero, and the system then waits for the next start or the next input of a pedal force F by setting the process to the start waiting mode of S-2.1 (FIG. 5). If there is no input signal from the outside such as an appropriate pedal force F and vehicle speed S for more than a given time period, the program then moves to a low power discrimination or energy-saving mode, as will be described later. For instance, the gate circuit 55 and main relay 54, as well as the power source section 58, are de-energized, and the CPU 48 stops operating except for the function of discriminating the presence of external inputs.

System Protection

Figure 9:
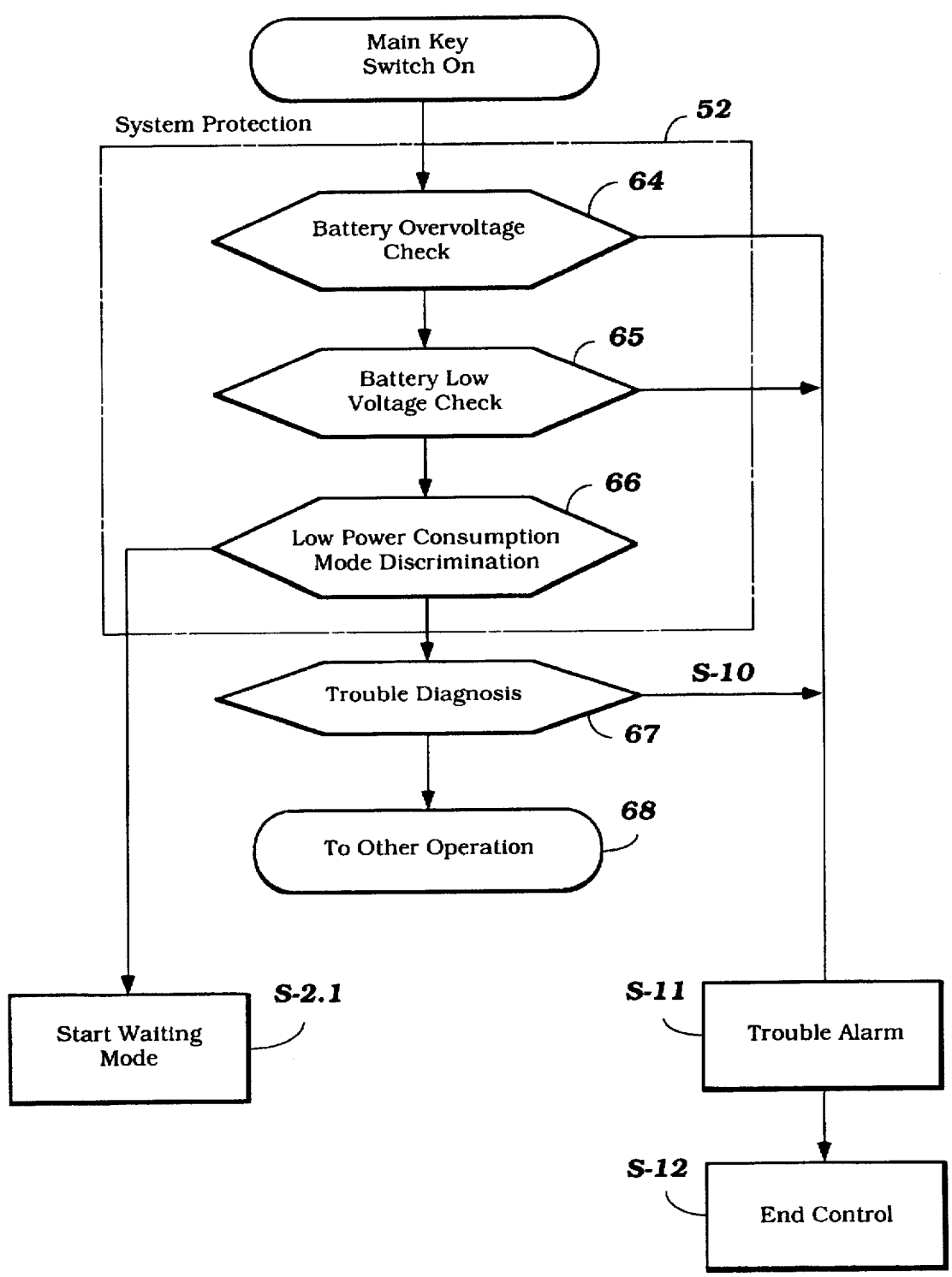
FIG. 9 is a block diagram showing the control routine for battery checking and warning.
Figure 10:
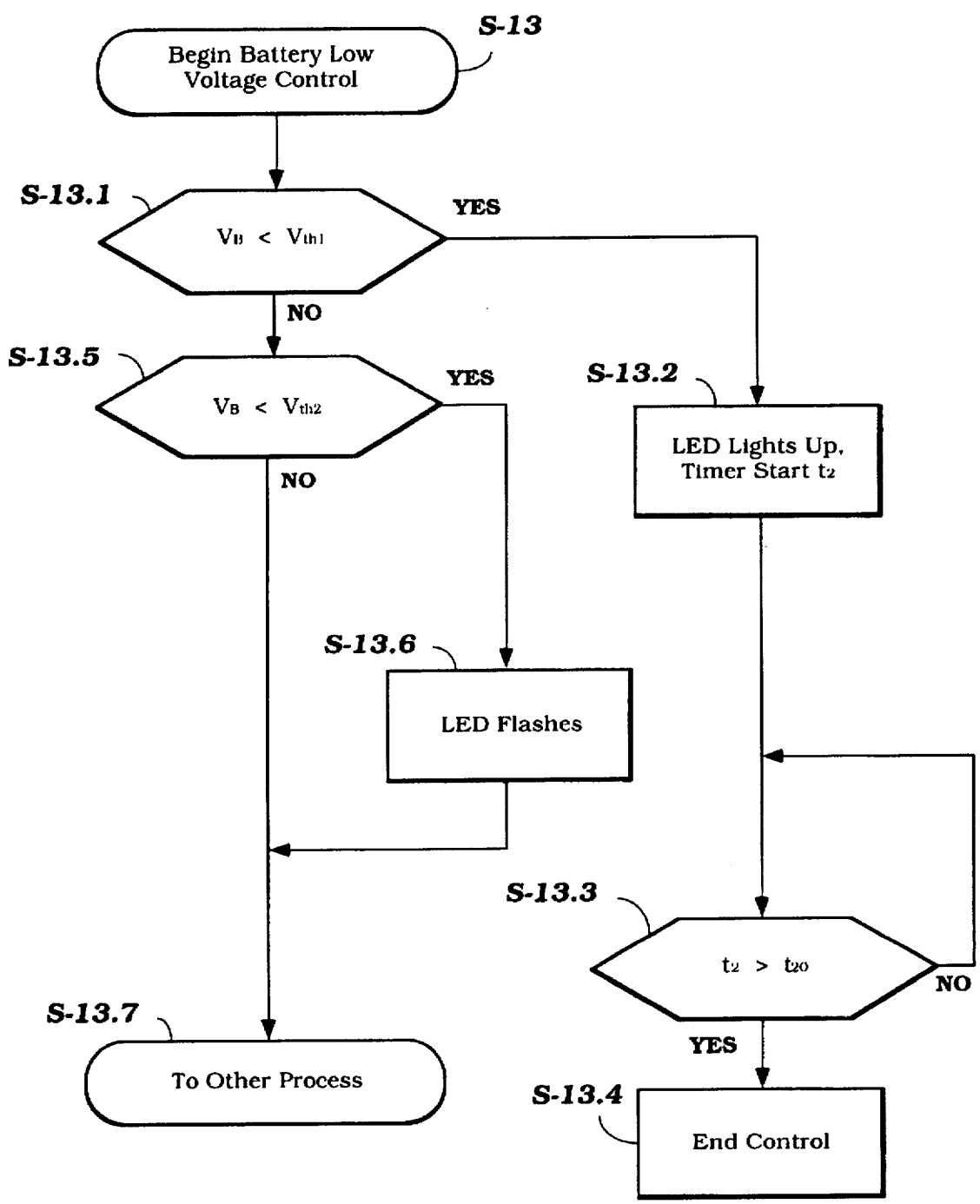
FIG. 10 is a block diagram showing the warning system in conjunction with low battery voltage and shut-down conditions.

As has been noted, the CPU 48 also includes a system protection system 52, and this system performs a protection routine as shown in FIGS. 9–10 by determining the condition of the battery. This is actually part of the run stop control routine and is repeated periodically during the time period when the system is operational. This system includes a detector 63 (FIG. 3), which determines the current flowing through the main circuit 57 and also includes an arrangement for checking the battery voltage in an appropriate manner. This system protection system 52 includes a battery over-voltage checking portion 64, a battery low-voltage checking portion 65, and a low-power consumption mode discriminating section 66.

The system needs protection from a high voltage in the battery which can exist, for example, if the operator replaces the batteries 39 with batteries of a higher voltage than the system is designed to utilize. If this is done, then the bicycle might be operated at too great a speed. In addition, if a higher than normal battery voltage exists, even when the main key switch is turned on, this can be due to the existence of charging of the batteries 39 when in place. It is desirable to prevent running during charging. Therefore, if it is determined by the battery over-voltage check at the section 64 that a higher than desired voltage exists, the program moves to a step S-11 where a trouble alarm is sounded and then to the step S-12 so as to end the control function. This is done even if the main switch is turned on and will protect the system as noted.

Assuming that the battery voltage is not over the desired voltage, then the program moves to the section 65 where the battery voltage is checked to determine if it is lower than a predetermined voltage in accordance with the routine as shown in FIG. 10.

Referring to FIG. 10, the low-voltage battery check is begun at the step S-13, and the battery voltage $V_B$ is compared with a predetermined relatively low-voltage $V_{TH1}$ at the step S-13.1. If the battery voltage $V_B$ is less than this low threshold voltage, then the program moves to the step S-13.2 to light an LED to warn the operator of the low battery voltage and starts a timer $t_2$. This timer $t_2$ runs for an accumulated time period equivalent to approximately five seconds $t_{20}$. Once the timer is initiated running at the step S-13.2, the program moves to the step S-13.3 to determine if the time on the timer $t_2$ is greater than the timer $t_{20}$. If it is not, the program continues to repeat. If it is, however, the program moves to the step S-13.4 so as to end the entire control function.

It should be noted that the control function and system is not shut off immediately if the battery voltage is less than the threshold battery voltage $V_{TH1}$, but rather the operator is given a warning by the illumination of the LED at the step S-13.2 so that he will know that the vehicle will be shut down. Thus, he has an opportunity to protect himself in the event an immediate power shut-off could cause problems.

If the voltage of the battery $V_B$ is greater than the low threshold voltage $V_{TH1}$, as determined at the step S-13.1, then the program moves to the step S-13.5 to compare the battery voltage $V_B$ with a somewhat higher threshold $V_{TH2}$. That is, $V_{TH2} > V_{TH1}$. If the voltage is below this voltage $V_{TH2}$, the operator is warned by the program proceeding to the step S13.6 so as to flash the warning LED, but the program then continues to conduct other processes at the step S-13.7. Of course, if the battery voltage $V_B$ is greater than the voltage $V_{TH2}$ at the step S-13.5, the program immediately moves to these other processes at the step S-13.7. Thus if the battery voltage is greater than $V_{th2}$ the system continues to operate normally but the rider is warned to check and charge the battery.

The low power consumption discriminating mode 66 shown in FIG. 9 is the mode which has already been described in conjunction with the routine of FIG. 8, and moves to the start waiting mode S-2.1 when this condition exists.

Figure 11:
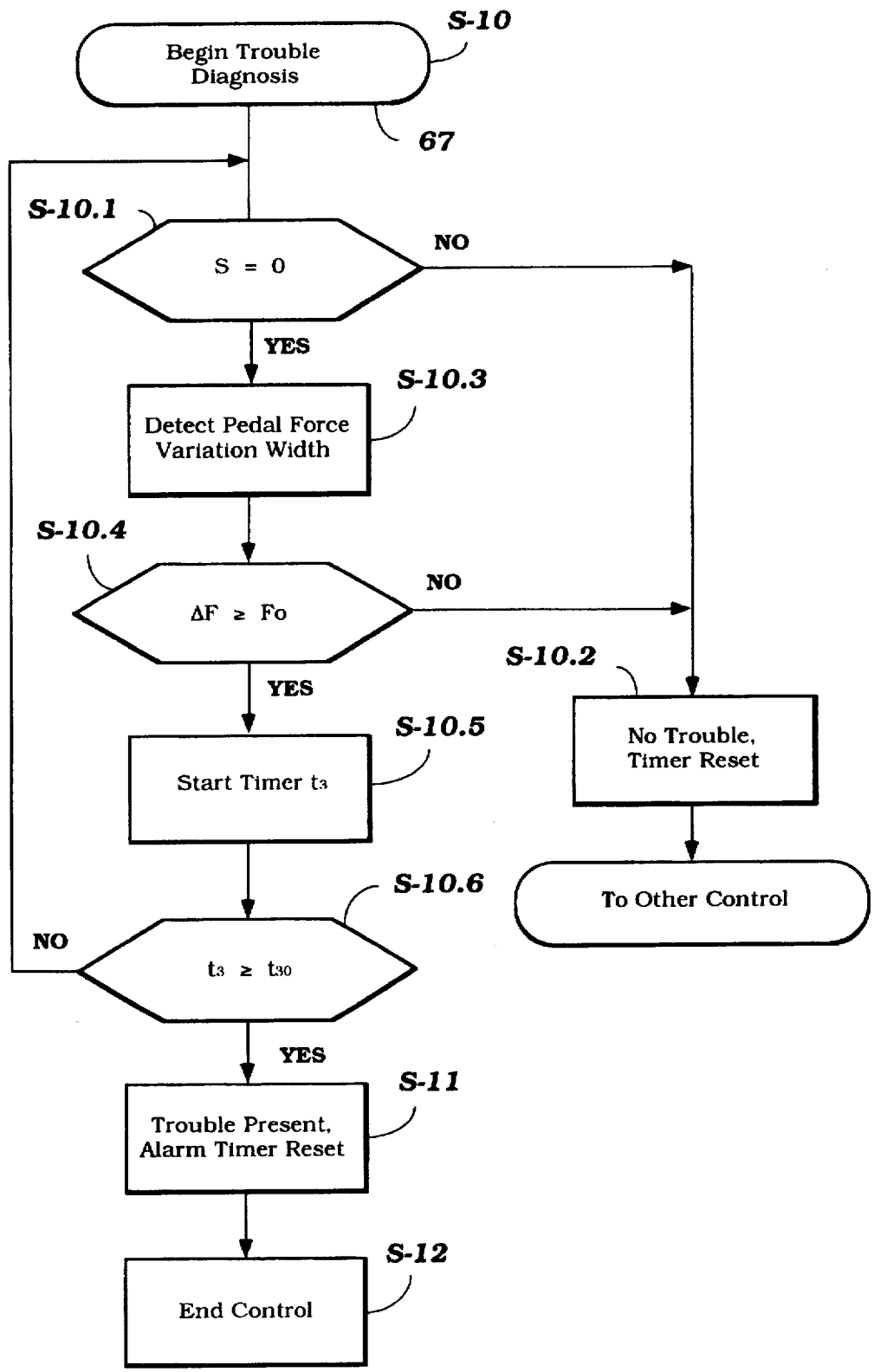
FIG. 11 is a block diagram showing the control routine employed to discontinue power and warn the operator.
Figure 12:
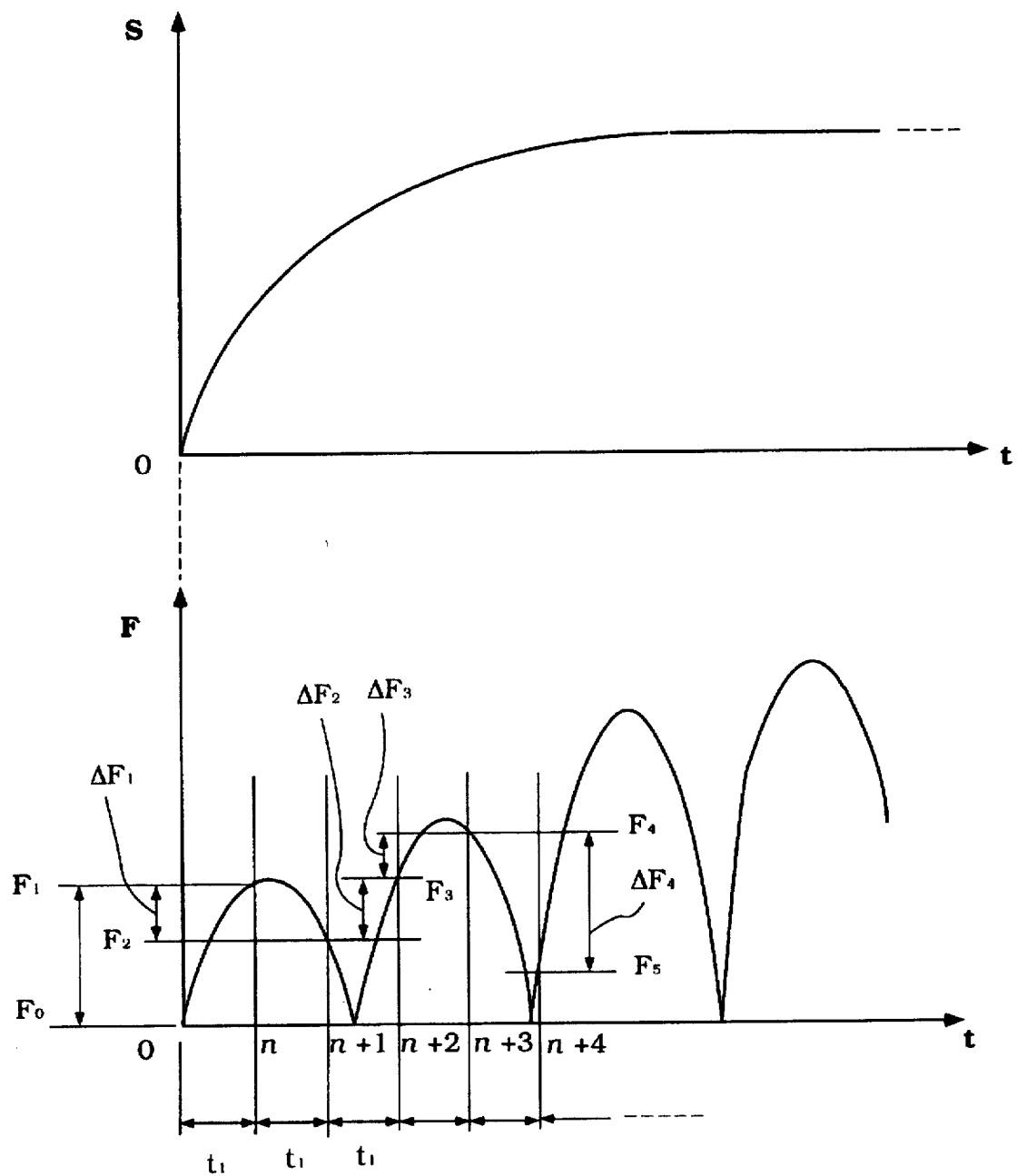
FIG. 12 is a graphical view useful in understanding the routine of FIG. 9 and shows the variation in forces and vehicle speed in relation to time.
Figure 13:
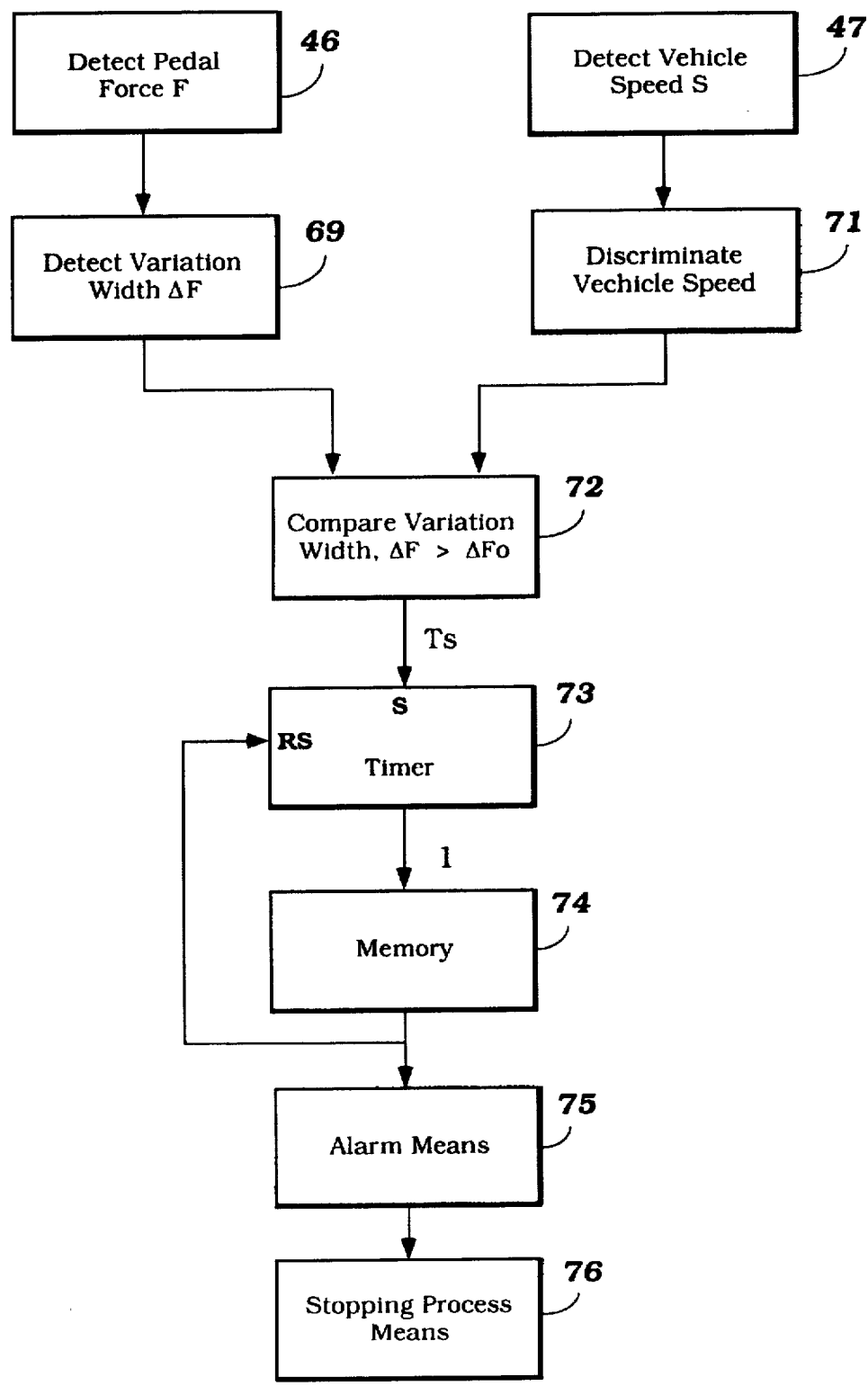
FIG. 13 is a block diagram showing the stop power routines.

After the completion of the battery over-voltage, low voltage and low power consumption modes by the sections 64, 65 and 66, the program moves to a trouble diagnosis function indicated by the step 13 and which is described in conjunction with FIGS. 11-13. After this function, the program moves to the program 68 to continue on with other checking operations.

Trouble Diagnosis

The trouble diagnosis section 67 will now be described by reference to FIGS. 11-13. As has been noted in the description of FIG. 9, when a trouble is diagnosed, the trouble alarm is sounded at the step S-11 and the control is discontinued at the step S-12. When the control is discontinued, the relay 54 (FIG. 3) is opened, and the only operation performed by the ECU is to continue to sense the condition of low power consumption mode discrimination by the section 66 and also the alarm process.

Although various troubles can be checked in the system, the trouble checking mode illustrated and which will be described is that of the speed sensor. As has been noted, if the speed sensor becomes inoperative, then there is a danger that the system will not operate properly, since many of the functions are dependent upon the output of the speed signal. If no output is sensed, the system assumes that the vehicle is stationary, which could cause a malfunction if, in fact, the vehicle is actually travelling.

The operation of the trouble diagnosis function will be described by reference to FIG. 11, but the diagram of FIG. 12, which shows bicycle speed and pedal input force during a start-up mode, is useful in understanding how the system operates to check the output of the speed sensor.

When the trouble diagnosis operation begins at the step S-10, the program moves to the step S-10.1 to read the output of the speed sensor 47. If the speed sensor is indicating a speed other than zero, it is assumed that the speed sensor is operating properly and the program moves to the step S-10 so as to reset the trouble timer and goes onto other controls.

If, however, the speed sensor is not outputting a signal at the step S-10.1, then the program moves to the step S-10.3 to detect the pedal force variation $\Delta F$ in a given time period, which can be the difference between the pedal forces $F_N$ and $F_{N+1}$ detected at constant time intervals $t_1$. This time interval, as shown in FIG. 12, may be 0.5 seconds, as an example.

The measured change in force $\Delta F$ is then compared with a fixed variable $\Delta F_0$ which is a constant and which may be actually the value of zero at the step S-10.4. If the change in force is not greater than the constant chosen $\Delta F_0$, then it is assumed that there is no trouble and the program moves to the step S-10.2 to reset the timer and moves onto other controls.

If, however, as in the embodiment illustrated in FIG. 12, there is a change in force, as there is from the time n to n1 of $\Delta F_1$ which is the difference between the force at the time n and the time n+1, then a timer is started at the step S-10.5 with the timer being indicated as $t_3$. The program then moves to the step S-10.6 to see if the timer has run more than a predetermined time interval, for example, 10 counts $t_{30}$. If the timer has just been set, it will not have exceeded this time and will repeat back. As may be seen from FIG. 10, there is a continuously changing force $\Delta F_2$, $\Delta F_3$, $\Delta F_4$, as the pedaling continues, and eventually the timer will have run for the time t30 at the step S-10.6 and the program moves to the step S-11 so as to sound the trouble alarm, reset the timer, and then moves to the step S-12 to cut off the power gradually, as aforenoted.

From this description, it should be readily apparent that the system is effective to determine when the speed sensor is defective, even if it is defective from the initiation of the operation.

The speed sensor checking process described in conjunction with FIGS. 11 and 12 may also be considered in block diagram form, as shown in FIG. 13. As shown in this figure, there is a stage 69 where the pedal force is measured by the force sensor 46 is compared with the previously measured force to establish the values $\Delta F$. At the same time, the output of the speed sensor 47 is discriminated at the step 71, and if there is a lack of vehicle speed signal, then the program moves to the block 72 so as to begin comparing the value of the change in pedal force $\Delta F$ with the predetermined value $\Delta F_0$. If $\Delta F$ is greater than $\Delta F_0$, then at the block 73, the timer is set and the trouble indication signal I is transmitted to a buffer memory 74. The program then continues to repeat so long as $\Delta F$ exceeds $\Delta F_0$, but if it does not, the program then moves back to reset the timer.

If, however, the memory 74 has run for the time period $t_{30}$, then the program moves to the step 75 to set the alarm and to the step 76 to begin the stopping process.

Alternate Smooth Start Routine

Figure 14:
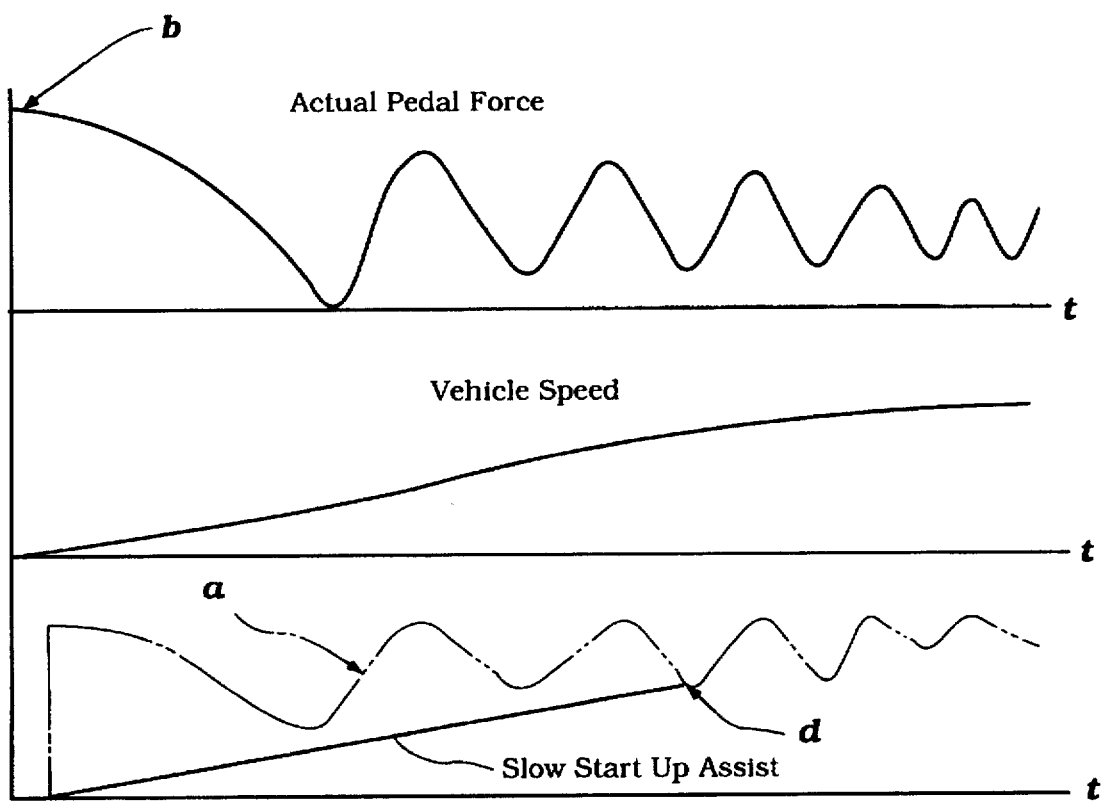
FIG. 14 is a graphical view showing pedal force, vehicle speed and power assist applied during start-up, in accordance with another type of smooth start routine.

As was mentioned in conjunction with the description of FIG. 5, the smooth start control for effecting a smooth start and gradual power assist is only one way in which a smooth start can be accomplished. FIG. 14 shows another embodiment of a smooth start type of control which differs from the previously described embodiment in having a curvilinear electric power assist during the initial start-up mode until that curve intersects the actual power demand assist curve. In this figure, the curve (A) shows the actual pedal force b, while the curve (C) shows the called-for power assist curve a in proportion to the pedal force curve b. The vehicle speed as shown by the center curve (B).

A curve d is chosen experimentally for the assist startup mode and when the program determines that there is startup in the start discrimination step of S-2 (FIG. 4), this curve is fed in for power assist. When this curve d intersects the actual assist curve a, then the system switches over to normal run control, as previously described.

It should be readily apparent from the foregoing description that the described apparatus and method of operating provides very good electric power assist for a vehicle. Although the described vehicle was a bicycle, as previously noted, it could be any time of manually powered vehicle. The system provides smooth start-up on the beginning of pedaling operation, senses when an actual start-up condition exists, avoids abrupt changes in power assist when the operator may otherwise create a pedaling force that calls for to provide for smooth riding, determines when the power should be shut off, and shuts it off while at the same time giving the operator a warning that power will be shut off. In addition, the system provides an arrangement for self-checking of various components, such as the battery voltage and the output of the speed sensor, and again gives appropriate warnings. Of course, the foregoing description is that of preferred embodiments of the invention and various changes and modifications may be made without departing from the spirit and scope of the invention, as defined by the appended claims.

We claim:

1. An electric power assisted vehicle comprised of at least one propulsion device, a manual power device for driving said propulsion device, an electric motor for driving said propulsion device, a control for controlling the power applied by said electric motor for driving said propulsion device, a vehicle speed sensor for sensing the speed at which said vehicle is driven, a force sensor for sensing the force applied to said manual power device, said control establishing a predetermined force which must be sensed by said force sensor before electric power assist will be supplied by said electric motor, means for comparing the speed of said vehicle sensed by said speed sensor with a predetermined vehicle speed when said predetermined force is applied, and means for precluding the application of electric power assist unless said predetermined vehicle speed is exceeded.

2. An electric power assisted vehicle as set forth in claim 1, wherein the value of the predetermined force is increased if the electric power assist is not initiated after a first comparison of vehicle speed with the predetermined vehicle speed.

3. An electric power assisted vehicle as set forth in claim 2, wherein the vehicle speed is compared with the predetermined vehicle speed on successive intervals if the predetermined speed is not exceeded and upon each comparison the predetermined force is increased from that of the previous comparison.

4. An electric power assisted vehicle as set forth in claim 3, further including means for discontinuing the operation if the predetermined vehicle speed has not been exceeded after a given number of comparisons.

5. An electric power assisted vehicle as set forth in claim 1, wherein the predetermined vehicle speed is zero.

6. An electric power assisted vehicle as set forth in claim 5, wherein the value of the predetermined force is increased if the electric power assist is not initiated after the first comparison of vehicle speed with the predetermined vehicle speed.

7. An electric power assisted vehicle as set forth in claim 6, wherein the vehicle speed is compared with the predetermined vehicle speed on successive intervals if the predetermined speed is not exceeded and upon each comparison the predetermined force is increased from that of the previous comparison.

8. An electric power assisted vehicle as set forth in claim 7, further including means for discontinuing the operation if the predetermined vehicle speed has not been exceeded after a given number of comparisons.

9. An electric power assisted vehicle as set forth in claim 5, wherein the control includes means for determining from the manual application of force to the manually powered device that an initial startup of the vehicle has occurred, determining a desired power assist from the initial force sensed by the force sensor, and applying initially a proportion of said desired power assist to said electric motor for a time interval, and thereafter increasing the amount of electric power assist in predetermined time intervals to provide a smooth start.

10. An electric power assisted vehicle as set forth in claim 9, wherein the control determines that an initial startup has occurred when the force sensed by the force sensor exceeds the predetermined force.

11. An electric power assisted vehicle as set forth in claim 10, wherein the control further determines that the vehicle is being started up when the predetermined force is exceeded and the vehicle speed is below the predetermined speed.

12. An electric power assisted vehicle as set forth in claim 11, wherein the predetermined vehicle speed is zero.

13. An electric power assisted vehicle as set forth in claim 9, wherein the control during normal running provides a power assist from the electric motor that is determined by the control from a map having coordinates related to vehicle speed as sensed by the vehicle speed sensor and force as detected by the force sensor.

14. An electric power assisted vehicle as set forth in claim 13, wherein the proportion a power assist generated during startup is a percentage of the mapped power assist for the vehicle speed and detected force conditions.

15. An electric power assisted vehicle as set forth in claim 14, wherein the power assist at start up is less than the mapped power assist.

16. An electric power assisted vehicle as set forth in claim 15, wherein the proportion of power assist is increased in equal increments in equal time intervals.

17. Art electric power assisted vehicle as set forth in claim 5, wherein the control provides a power assist from the electric motor derived as a function of vehicle speed sensed by the vehicle speed sensor and force sensed by the force sensor under steady state conditions, said control reading said force and said vehicle speed values at time intervals, and means for sensing if the read values call for a variation in the amount of power assist by said electric motor greater than a predetermined amount and reducing the change in power assist from that called for in progressively increasing incremental rates.

18. An electric power assisted vehicle as set forth in claim 17, wherein the control provides only progressively increasing incremental rates of power assist if the difference between the mapped power assist and the sensed force is greater than a predetermined mount.

19. An electric power assisted vehicle as set forth in claim 18, wherein the power assist is changed incrementally if the sensed force varies more than the predetermined amount in either an increasing or decreasing direction.

20. An electric power assisted vehicle as set forth in claim 19, wherein the incremental change is equal in both the increasing and decreasing directions in the event the predetermined amount of force difference is exceeded.

21. An electric power assisted vehicle as set forth in claim 5, wherein the control is effective to discontinue electric motor power assist when the sensed vehicle speed is less than the predetermined speed and when the force sensed by the force sensor is less than a predetermined value for a predetermined time.

22. An electric power assisted vehicle as set forth in claim 21, wherein the predetermined vehicle speed is zero.

23. An electric power assisted vehicle as set forth in claim 21, wherein the electric motor power assist is discontinued over a relatively short time period.

24. An electric power assisted vehicle as set forth in claim 23, further including means for providing a warning signal when the electric motor power assist is to be discontinued.

25. An electric power assisted vehicle as set forth in claim 21, wherein the control further includes means for discontinuing electric motor power assist when the sensed vehicle speed is less than the predetermined vehicle speed and when the force sensor does not sense a force variation in successive time intervals greater than a predetermined amount of force difference.

26. An electric power assisted vehicle as set forth in claim 25, wherein the predetermined force difference is a force difference that is less than the predetermined force.

27. An electric power assisted vehicle as set forth in claim 26, wherein the time is set by a counter that is started when the predetermined force difference does not exceed the predetermined amount of force difference and is discontinued if the predetermined force difference does not exceed the predetermined amount within the predetermined time period.

28. An electric power assisted vehicle as set forth in claim 5, wherein the control is effective to discontinue electric motor power assist when sensed vehicle speed is less than the predetermined speed and when the output signal of the force sensor does not vary by more than a predetermined amount within a predetermined time period.

29. An electric power assisted vehicle as set forth in claim 28, wherein the time interval is set by a counter that is started when the predetermined force difference does not exceed the predetermined amount of force difference and is discontinued if the predetermined force difference does exceed the predetermined amount within the predetermined time period.

30. An electric power assisted vehicle as set forth in claim 5, further including means for determining the speed sensor is defective if said speed sensor does not output a speed signal and the force sensor outputs a signal indicative of more than a predetermined force difference in a predetermined time period and further including means for discontinuing the electric motor power assist when said speed sensor is determined to be defective.

31. An electric power assisted vehicle as set forth in claim 30, wherein the electric motor power assist is discontinued when the speed sensor is determined to be defective gradually.

32. An electric power assisted vehicle as set forth in claim 5, further including means for sensing a defect in said vehicle and means for providing an indication of said defect and discontinuing the power assist by said electric motor for a predetermined time interval after indication of the vehicle defect.

33. An electric power assisted vehicle as set forth in claim 32, wherein the vehicle defect comprises a defect in the vehicle speed sensor.

34. An electric power assisted vehicle as set forth in claim 32, wherein the vehicle further includes a battery for powering the electric motor and wherein the vehicle defect is the condition of the battery.

35. An electric power assisted vehicle as set forth in claim 34, wherein low battery voltage is determined to be a vehicle defect.

36. An electric power assisted vehicle as set forth in claim 35, further including means for providing a warning signal in the event the electric motor assist is to be discontinued.

37. An electric power assisted vehicle as set forth in claim 36, wherein warning signal is provided if the battery voltage is lower than an amount that is higher than the low battery voltage at which the power assist is discontinued.

38. An electric power assisted vehicle as set forth in claim 5, further including a battery for providing electrical power to said electric motor, a battery voltage tester for testing the output voltage of said battery, and means for precluding the transmission of electrical power from said battery to said electric motor if said battery voltage is different from a predetermined voltage.

39. An electric power assisted vehicle as set forth in claim 38, wherein the electrical power transmission is discontinued if the battery voltage is greater than the predetermined voltage.

40. An electric power assisted vehicle as set forth in claim 38, wherein the electric power transmission is discontinued if the battery voltage is lower than the predetermined voltage.

41. An electric power assisted vehicle as set forth in claim 40, wherein the transmission of electrical power from the battery is also discontinued if the battery voltage is above a second predetermined voltage higher than the first mentioned predetermined voltage.

42. An electric power assisted vehicle as set forth in claim 38, wherein means are provided a warning in the event the battery voltage is outside of a predetermined range including the predetermined voltage.

43. An electric power assisted vehicle as set forth in claim 38, wherein the transmission of electric power from the battery to the electric motor is terminated at the predetermined time after the battery voltage is found not to be the predetermined voltage.

44. An electric power assisted vehicle as set forth in claim 43, wherein the electrical power transmission is discontinued if the battery voltage is greater than the predetermined voltage.

45. An electric power assisted vehicle as set forth in claim 43, wherein the electric power transmission is discontinued if the battery voltage is lower than the predetermined voltage.

46. An electric power assisted vehicle as set forth in claim 45, wherein the transmission of electrical power from the battery is also discontinued if the battery voltage is above a second predetermined voltage higher than the first mentioned predetermined voltage.

47. An electric power assisted vehicle as set forth in claim 38, wherein a warning is given if the battery voltage falls below a second predetermined voltage higher than the predetermined voltage and the electric power is precluded from transmission to the electric motor only when the battery voltage is lower than the predetermined voltage for a predetermined time period.

* * * * *